US00RE34270E

United States Patent [19]

Tochiyama et al.

[11] E Patent Number: Re. 34,270

[45] Reissued Date of Patent: Jun. 1, 1993

[54] DIVIDED HOUSING FOR SUPPORTING MAGNETIC DISKS

[75] Inventors: Kazunori Tochiyama, Kawasaki; Takahisa Mihara, Kobe, both of Japan

[73] Assignee: Fujitsu Limited, Kanagawa, Japan

[21] Appl. No.: 783,831

[22] Filed: Oct. 29, 1991

Related U.S. Patent Documents

Reissue of:

[64] Patent No.: 4,899,237
Issued: Feb. 6, 1990
Appl. No.: 366,366
Filed: Jun. 15, 1989

U.S. Applications:

[63] Continuation of Ser. No. 142,999, Jan. 12, 1988, abandoned.

[51] Int. Cl.[5] ..... G11B 5/012; G11B 17/08

[52] U.S. Cl. ..... 360/98.02; 360/98.07

[58] Field of Search ..... 360/97.01, 97.02, 97.03, 360/97.04, 98.01, 98.02, 98.07, 99.01, 99.04, 99.08, 99.11

[56] References Cited

U.S. PATENT DOCUMENTS

| | | | |
|---|---|---|---|
| 3,923,197 | 12/1975 | Kuhn | 220/344 |
| 4,677,509 | 6/1987 | Nishida et al. | 360/98.07 |
| 4,692,827 | 9/1987 | Biermeier et al. | 360/137 X |
| 4,703,374 | 10/1987 | Biermeier et al. | 360/98 |
| 4,714,972 | 12/1987 | Biermeier et al. | 360/98 X |
| 4,754,353 | 6/1988 | Levy | 360/98 X |

FOREIGN PATENT DOCUMENTS

| | | |
|---|---|---|
| 0151258 | 12/1984 | European Pat. Off. . |
| 2718563 | 4/1977 | Fed. Rep. of Germany . |

OTHER PUBLICATIONS

Patent Abstracts of Japan, unexamined applications, P field, vol. 7, No. 206, Sep. 10, 1983. The Patent Office Japanese Government, p. 141 P 222.

Patent Abstracts of Japan, unexamined applications, E field, vol. 2, No. 58, Apr. 26, 1978. The Patent Office Japanese Government, p. 1562 E 78.

*Primary Examiner*—Andrew L. Sniezek

*Attorney, Agent, or Firm*—Morgan & Finnegan

[57] ABSTRACT

A divided housing for supporting magnetic disk devices therein is described. The housing is separated into a shell which supports a magnetic disk pack and a magnetic head positioner, and a cover to close the opening of the shell. Spindles of the disk pack and the head positioner are respectively held at opposite ends by ball bearings. Supporting holes for supporting the bearings are formed in side walls of the shell facing each other with one boring process. The centers of the bearings are aligned precisely coaxial to each other. The place which separates the housing into the shell and the cover intersects the side walls almost parallel to the line connecting the center of both spindles, but away from those supporting bearings. The supporting holes are perfect circles, and the open edge of the shell has no cut-in portion or grooves. This increases mechanical stength of the shell, and assures a stable bolding of the spindles. Therefore, the reliability of the magnetic disk device is improved.

11 Claims, 7 Drawing Sheets

DIVIDED HOUSING FOR SUPPORTING MAGNETIC DISKS

Matter enclosed in heavy brackets [ ] appears in the original patent but forms no part of this reissue specification; matter printed in italics indicates the additions made by reissue.

This is a continuation of co-pending application Ser. No. 07/142,999 filed on Jan. 12, 1988, now abandoned.

BACKGROUND OF THE INVENTION

1. Field of the Invention

The present invention relates to a magnetic disk memory device and, more specifically, to a housing having an improved structure for supporting a magnetic disk pack and a magnetic head positioner therein.

2. Description of the Related Art

A magnetic disk device has a magnetic disk pack which includes a plurality of magnetic disks coaxially stacked on a spindle with a predetermined spacing between each other, and a magnetic head positioner having a plurality of arms, each carrying a magnetic head. The arms and the disks are alternately arranged with each of the arms positioned in the spaces between the disks. One end of each of the arms is fixed on a second spindle. By rotating the second spindle back and forth by a specific angle around its axis, each of the magnetic heads is brought to a position over a desired magnetic track formed on the corresponding disk surface to read or write the information into the track.

Technical trends in recent development of the magnetic disk device are mainly oriented towards increasing the density of memories stored on the surface of the magnetic disk, and achieving a short access time to the stored memory. On the other hand, space allotted for the magnetic disk device in electronic devices is becoming small due to the trend of miniaturization of electronic devices. For example recent magnetic disk devices having an outer diameter of 21 cm and an inner diameter of 10 cm, the track density of the memory tracks on the disk surface has reached up to 1,000 tpi (tracks per inch), and the rotational speed of the disk has become as fast as 3,600 rpm.

The magnetic head should not make contact with the disk surface in order to avoid wearing and damaging both the disk and the magnetic head. However, it is desirable to keep the distance between the magnetic head and the disk surface as small as possible in order to increase the sensitivity of the magnetic head and to decrease the area of magnetic domain required for storing a bit, and hence to increase the bit density in the magnetic track. The gap between the magnetic head and the disk surface is known as the "flying height" in the art. In recent apparatus, the flying height has become as narrow as 0.2 μm. Moreover the flying height must be kept constant, in order to maintain the constant sensitivity of the magnetic head, and to attain a stable operation of the device. It is, therefore, a very difficult bu important task to keep a constant flying height between the magnetic disk rotating with high speed, and to set the magnetic head precisely in a position over the desired magnetic track which has a narrow width, 25 μm for example.

In order to keep precisely the relative position between the magnetic head and the magnetic track at a constant value, it is important to achieve a stable and smooth motion of both spindles of the magnetic disk pack and the magnetic head positioner. The supporting mechanism of both spindles and a housing for supporting them, is one of the crucial mechanisms for the magnetic disk devices. The housing for supporting the magnetic disk pack and these mechanisms has the additional function of a container to seal them from the ambient space and to protect them from dust and moisture. Accordingly, the design of the housing of the disk pack is important for improving the performance of the magnetic disk devices. The design also relates to the cost for assembling and adjusting the magnetic disk apparatus.

Generally, the housing of the magnetic disk pack is separated into two parts, a shell and cover, in order to install the disk pack inside. The shell supports mechanically the disk pack and the magnetic head positioner, while the cover seals the opening of the shell through which the magnetic disk and other mechanisms are installed.

FIG. 1 is a partial cutaway perspective view of an exemplary magnetic disk apparatus illustrating its general configuration. The housing 1 is divided into a shell 1A' and a cover 1B'. The shell and the cover are joined to each other at line 1a. It may be considered that the entire apparatus is composed of the part shown in FIG. 1 and another half part having almost symmetrical structure to that of FIG. 1.

In FIG. 1, 1A is a shell part of the housing for supporting the spindle 2 of a magnetic disk pack and a magnetic head positioner 3. Six magnetic disks 100 are assembled in a stack around the spindle 2. The number of the disks may be varied depending on the size of the memory to be stored in the apparatus. The spindle 2 is supported at both ends by ball bearings 7 and 8. These bearings contains a ferrofluidic seal which keeps airtight the space between the inside and outside separated by the bearing while assuring free rotation of the spindle 2. The magnetic disks 100 are spaced with a predetermined distance between each other and are rotated by the spindle 2, which is powered by a DC motor 4 attached to one end of the spindle 2. The magnetic head positioner 3 has a similar structure as that of the magnetic disk pack. The positioner 3 has arms (not completely shown) fixed to a spindle 5, which is supported by ball bearings 9 and 10. The spindle 5 is driven by a voice coil motor 6 to rotate about its axis to the left and right by a desired angle. So, the magnetic head (not shown) supported by arms is brought to a desired position over the magnetic disk.

Generally, the magnetic disk pack and the magnetic head positioner are supported at their opposite ends by bearings as shown in FIG. 1. Such double-ended support structure is superior than the single-ended support structure that supports the spindle by only one bearing attached to one end of the spindle, because the double-ended structure provides more stable operation of the device compared to the single-ended structure. Especially the former is better because it may be used regardless of the inclination of the axis of the spindle, vertical or horizontal for example, although in some cases, the spindle of the magnetic head positioner may be a single-ended structure. In the following disclosure, however, the explanation will be described with respect to a double-ended structure. It will be apparent that the disclosure may be easily applied to the single-ended structure as well.

As described before, the housing of the magnetic disk pack (simplified as "housing" hereinafter) is separated into two parts, the shell and cover, in order to install the disk pack therein. The housings of the prior art devices are summarized in several types depending on the cross-section of the housing, that is, the relationship between the housing and a cutting plane which intersects the housing to divide it into two parts. Typical cross-sectional types are schematically shown in FIGS. 2(a) through 2(d).

FIGS. 2(a)–(d) are schematic diagrams illustrating some of the typical ways the housing is separated into two parts by a cutting plane. FIG. 2(a) is a first type. The figure shows a cross section of a housing 1A, containing the disks 100, their spindle 2A and the spindle 5A of the magnetic head positioner (not shown completely). The housing 1A is mechanically separable into left and right parts at a border plane positioned vertically to the page at a line a—a. After the magnetic disks 100, their spindle 2A and the spindle 5A of the magnetic head positioner are installed into the housing 1A, the left and right parts of the housing are connected to each other. Details of such type of magnetic disk device are disclosed in, for example, U.S. Pat. No. 4,315,288, issued to Bernett et al. on Feb. 9, 1982.

In such configuration, both ends of the spindles of the magnetic disk pack and the magnetic head positioner (simplified respectively as "disk pack" and "head positioner" hereinafter) are supported by a pair of walls, each belonging to an opposite half of the housing respectively. Thus, the centers of the bearings which support the spindles at their opposite ends are apt to become eccentric from each other. The adjustment of there bearings is very critical, in order to keep tightly the magnetic head and the magnetic disk in respective desired position. Moreover, if both halves of the housing belong to different fabrication lots from each other, this sometimes raises a problem of thermal off-track caused by the difference in thermal expansion coefficient between the lots of the two halves of the housing.

Sometimes in order to avoid such difficulty, use of the single-ended type structure is adopted. However, as previously mentioned, the support stability of the spindles is insufficient. This problem increases when the number of spindles or the rotational speed of the disks is increased.

FIG. 2(b) is a schematic side view of a housing illustrating a second type of separation of the housing. As shown in the figure, the housing is separated into upper and lower parts between the spindle 2B of the disk pack and the spindle 5B of the head positioner. The words upper and "lower" or "left" and "right" with respect to the housing are relative, but such words will be used in the following description for the sake of identification. The cutting plane is positioned vertically to the page along a line b—b. The device shown in FIG. 1 belongs to this type. In the case of FIG. 2(b), slots 4B are provided on both opposite sides of the walls of the upper half of the housing 1B. The slot 4B is cut from the opening edge along the line b—b to the position of the spindle 2B in order to set the spindle at the position. In the figure, the spindle 5B is a single-ended type, so the slot is unnecessary for the spindle 5B. If the spindle 5B is to be supported at its opposite ends, however it would be necessary to provide another pair of slots in the lower half of the housing like slot 4B on the upper half of the housing.

in the type of FIG. 2(b), the spindles 2B and 5B of the disk pack and the head positioner are respectively installed in complementary halves of the housing, and are subsequently mechanically connected to each other. Thus, the adjustment for keeping the relative position between the magnetic head and the disk is very critical, although the problem of the thermal off-track described with respect to the type 1 is not overcome. Also, since the housing has slots cut in both side walls of the housing, the housing lacks rigidity. Finally, since the number of parts of the housing increases, the assembling cost also increases.

FIG. 2(c) shows schematically a side view of a third type of housing. The housing 1C is separated into left and right halves by a plane indicated by a line c—c, which passes through the centers of the spindles 2C and 5C of the disk pack and the head positioner. In the type of FIG. 2(c), the holes to support the spindles 2C and 5C are separated into two semicircles. This increases the difficulty of making the holes, and hence decreases the accuracy of roundness of the circle formed by combining these two semicircles. The rigidity of the housing to support the spindles 2C and 5C is decreased, and the disk pack sometimes may suffer from vibration. The thermal off-track problem is not overfed. Moreover, the engaging surfaces of the left and right halves of the housing are not a single plane because of the semicircles cut for the spindles. This increases the difficulty of inserting sealing means between the two halves of the housing which seal off the disk pack from the surrounding spaces. Thus, air tightness is often decreased.

FIG. 2(d) shows schematically a side view of a fourth type of the housing, in which the housing 1D is divided into a shell 1D' and a cover 1D" by a plane d—d which passes through a spindle 5D of the head positioner, and intersects the side of the housing diagonally. In this type, the side slots 4D for inserting the spindle 2D of the disk pack is necessary. In the type of FIG. 2(d), the spindle 5D is a single-ended type. More details of such a type as described in for example, U.S. Pat. No. 4,692,827 issued to Biermeier et al. which issued on Sep. 8, 1987. This type is intended to ease the difficulty in assembly of the device. However, the difficulties as described with respect to the types 2(b) still remain.

As has been described above, the structure of the prior art housing is directed to ease the assembly of the disk device. By doing so, they are intended to increase the accuracy of the assembled device. Accordingly, in many cases, the spindle, especially the spindle of the head positioner, is a single-ended type. The double-ended spindle is supported by a pair of holes which is divided into two parts by the intersection plane, or at least the hole is cut away at one side by the slot to insert the spindle. This causes a lack of rigidity of the housing and causes various problems described above.

SUMMARY OF THE INVENTION

An object of the present invention, therefore, is to provide a housing for a magnetic disk pack device having a high mechanical rigidity, suitable for positioning the magnetic head precisely on a desired position over the magnetic disk, and to realize a magnetic device having a high memory density and high operation speed.

Another object of the present invention is to provide a magnetic disk device which can accommodate a plurality of magnetic disks.

Still another object of the present invention is to provide a structure of a housing which can support the spindle of a magnetic disk pack at its opposite ends with high mechanical rigidity.

A further object of the present invention is to provide a structure of a housing which can support the spindle of a magnetic head positioner with high mechanical rigidity.

The ultimate object of the present invention is to provide a divided housing for supporting the spindles of the magnetic disk device which enables the realization of the above objects.

The above objects are attained by dividing the housing into a shell having a structure like a rectangular tub for supporting the magnetic disk pack and the magnetic head positioner therein, and a shell to cover the opening of the shell through which the magnetic disk pack and the magnetic head positioner are installed. The feature of separation of the housing by the present invention is shown in FIG. 3. The figure shows schematically a side view of a housing of the present invention. As can be seen in the figure, the cutting plane indicated by a line e—e does not cross the portion which supports a bushing.

The shell has perfect circular supporting holes at a position where the spindle is to be held. The supporting holes have a diameter for engaging the periphery of a cylindrical bushing which supports a ball bearing in its center. The supporting holes are formed on each of the side walls of the shell, which are facing each other, with one boring process. Accordingly, the holes can be formed as perfect circles and the centers of the pair of the supporting holes can be aligned perfectly concentric to each other. The ball bearing and the bushing are inserted into respective supporting holes form outside of the shell and fixed to it while the spindle is held in its position by a jig. At the same time the opposite ends of the spindle are inserted into the inner ring of the ball bearing. Thus the centers of the bearings are held coaxially to each other enabling the spindle to rotate smoothly with stability. Such a structure can be used for supporting both the magnetic disk pack and the magnetic head positioner.

The edge of the tub-like shell has neither cut-in portion nor slot. Therefore, the shell provides high mechanical rigidity to ensure an accurate positioning of the disk pack and the head positioner. The cover is connected to the shell to seal off the disk pack from the outer space. Since the engaging surface of the shell and the cover is in a single plane, and it has no cut-in portion or slot, it is easy to insert a packing between them, Thus, air tight sealing is easily attained. The number of parts for the structure of the present invention is minimum, and the assembling is very easy. The cost of the magnetic disk device is thereby reduced. The advantage of the present invention will become more apparent from the detailed description to follow.

BRIEF DESCRIPTION OF THE DRAWINGS

FIGS. 2(a)–2(d) are schematic diagrams illustrating four different prior art ways in which a housing is separated into two parts at a cutting plane, wherein:

FIG. 2(a) is a first type in which the housing is separated at a plane orthogonal to the axis of spindle;

FIG. 2(b) is a second type in which the housing is separated into upper and lower parts at a plane between the spindles of the disk pack and the head positioner;

FIG. 2(c) is a third type in which the housing is separated into left and right halves by a plane passing through the centers of the two spindles of the disk pack and the head positioner; and FIG. 2(d) is a fourth type in which the housing is divided into a shell and a cover by a plane which passes through a spindle of the head positioner, and diagonally intersects the side wall of the housing.

Throughout the figures, like or similar reference numerals designate the same or corresponding parts.

DETAILED DESCRIPTION OF THE PREFERRED EMBODIMENTS

Figure 1:
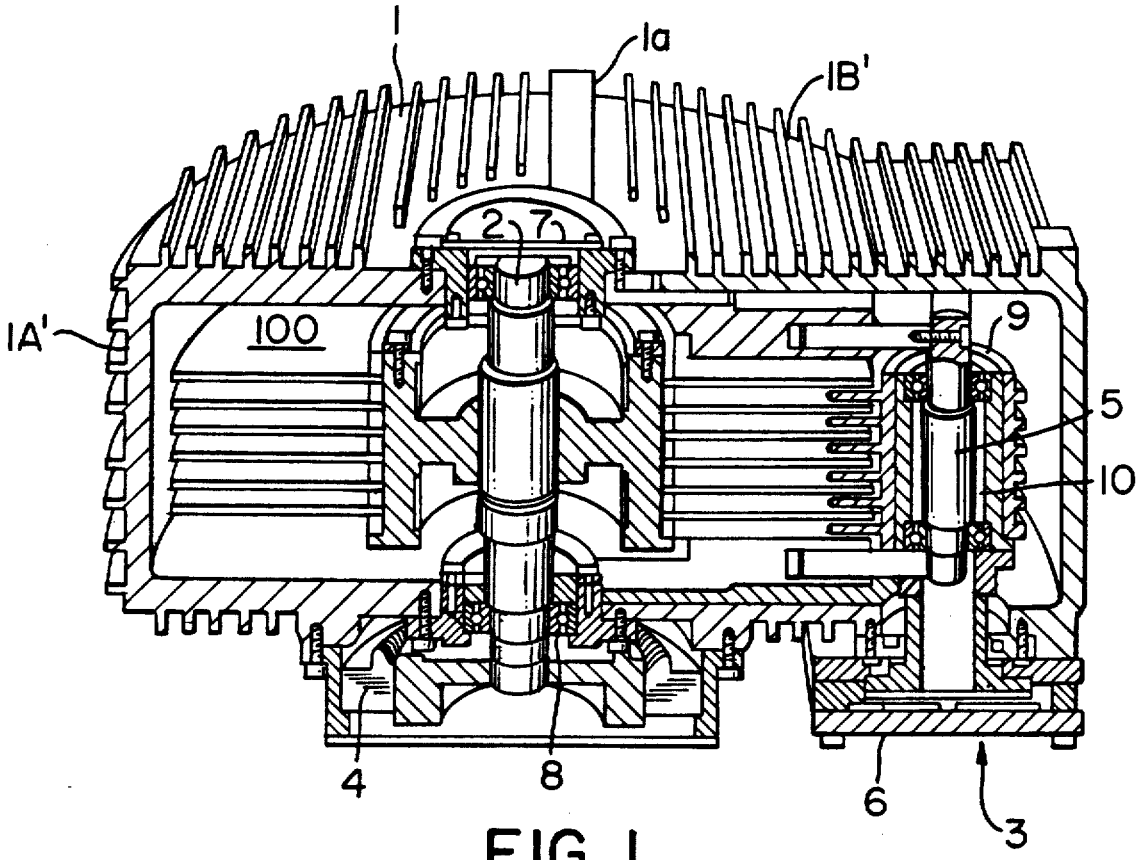
FIG. 1 PRIOR ART
FIG. 1 is a partially cut away view in perspective of exemplar magnetic disk equipment of the prior art.
Figure 2A:
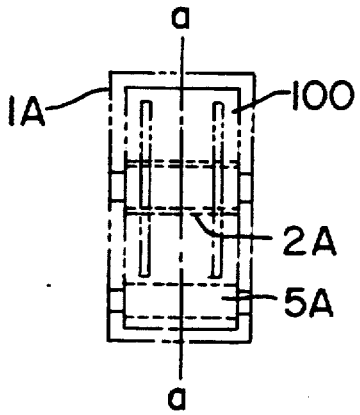
FIG. 2(a) PRIOR ART
Figure 2B:
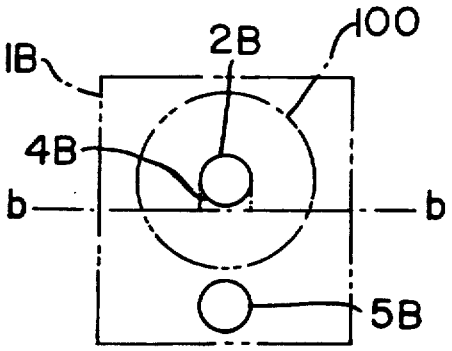
FIG. 2(b) PRIOR ART
Figure 2C:
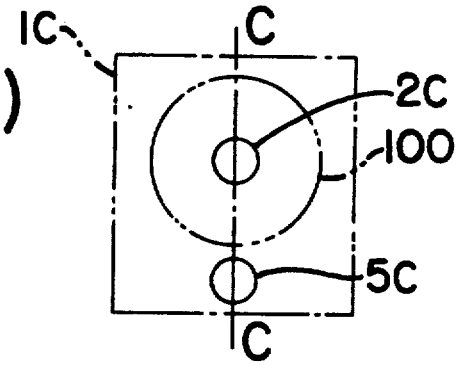
FIG.2(c) PRIOR ART
Figure 2D:
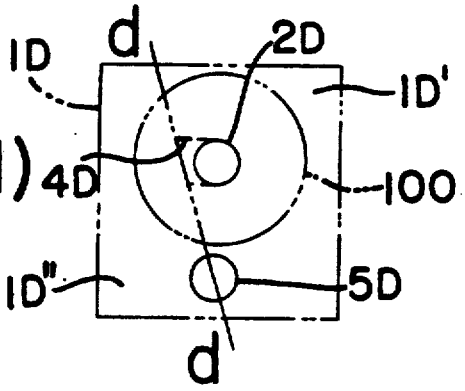
FIG.2(d) PRIOR ART
Figure 3:
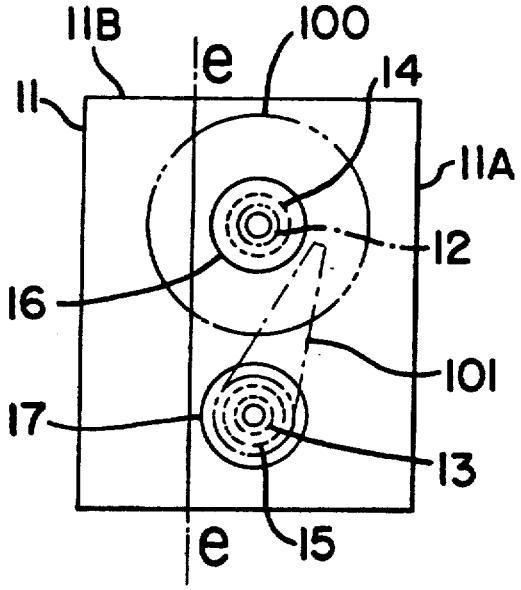
FIG. 3 is a schematic side view of a housing of the present invention illustrating the featured cutting method, wherein the cutting plane does not intersect the portion supporting the spindles.

First, the essential structure of the housing according to the present invention will be described referring to FIG. 3. FIG. 3 is a side view of a housing illustrating how it is divided into two parts to insert the disk pack and the head positioner therein. The housing 11 can be separated into a shell 11A and a cover 11B at a plane vertically intersecting the page at a line e—e in the figure. The shell and the cover has a shape like a rectangular tub. They are engaged to each other as shown in FIG. 3 after the disk pack and the head positioner are installed therein.

A couple of side walls of the shell 11A facing each other are respectively provided with supporting means for supporting the spindles 12 and 13 of the disk pack and the head positioner respectively. Namely, supporting holes 14 and 15 are provided in each side wall. These holes are respectively paired with each counter part provided on opposite side walls. The pair of the supporting holes 14 supports the spindle 12 at its opposite ends, and the pair of the supporting holes 15 supports the spindle 13 at its opposite ends. The spindle 12 supports the disk(s) 100, and the spindle 13 supports the arm 101 of the head positioner. Each pair of these supporting holes is formed in one boring process cutting through opposite side walls facing each other. Therefore, the centers of each supporting hole in the pair are aligned perfect coaxially to each other. This is a first feature and first advantage of the structure of the housing of the present invention over the prior art housings.

Each of the supporting means further includes a pair of cylindrical bushings 16 or 17, and a pair of ball bearings housed in respective bushings. Each ball bearing is supported by the bushing and inserted into the supporting hole from outside of the shell. Therefore, the centers of the paired ball bearings are easily aligned coaxially to each other. This is second feature and second advantage of the the structure of the housing of present invention over the prior art housings.

As can be seen in FIG. 3, the supporting holes 14 and 15 are located away from the open edge e—e of the shell toward the bottom side of the tub shaped shell. Thus, there is neither a cut in nor a slot on both the open edge e—e or the supporting holes 13 and 14. This is a third feature and third advantage of the present invention over the prior art, because is can provide a more rigid structure of the housing to support the spindles compared to those of the prior art.

Further, the supporting holes can be furnished to a perfect circle, thereby allowing the centers of the bearings to be tightly held in coaxially alignment to each other. This is a fourth feature and a fourth advantage of the present invention over the prior art.

Since the cutting plane e—e does not cross the supporting portion of the spindles, the joining surface of the shell and the cover are single plane. It is unnecessary to provide the aforementioned cut in or slot. This makes it easy to insert sealing means between the shell and the cover so that air tightness of the housing is attained easily. This is a further advantage of the present invention.

It will be easily understood that both supporting means for the spindles of the disk pack and the head positioner can be formed with a similar configuration. This means the assembly steps for fabrication of the housing are easy and simple compared to the prior art. This is an additional advantage of the present invention.

It should be added that, in FIG. 3 and the above disclosure, the cutting plane e—e is shown to be parallel to the line connecting the centers of the spindles 12 and 15. It is be understood that the line e—e is not necessarily parallel to the line connecting both centers. Further, the separation line e—e is not necessarily a straight line. This means the junction surface may not be formed on a flat plane, although the straight line and flat plane are most practical.

Figure 4:
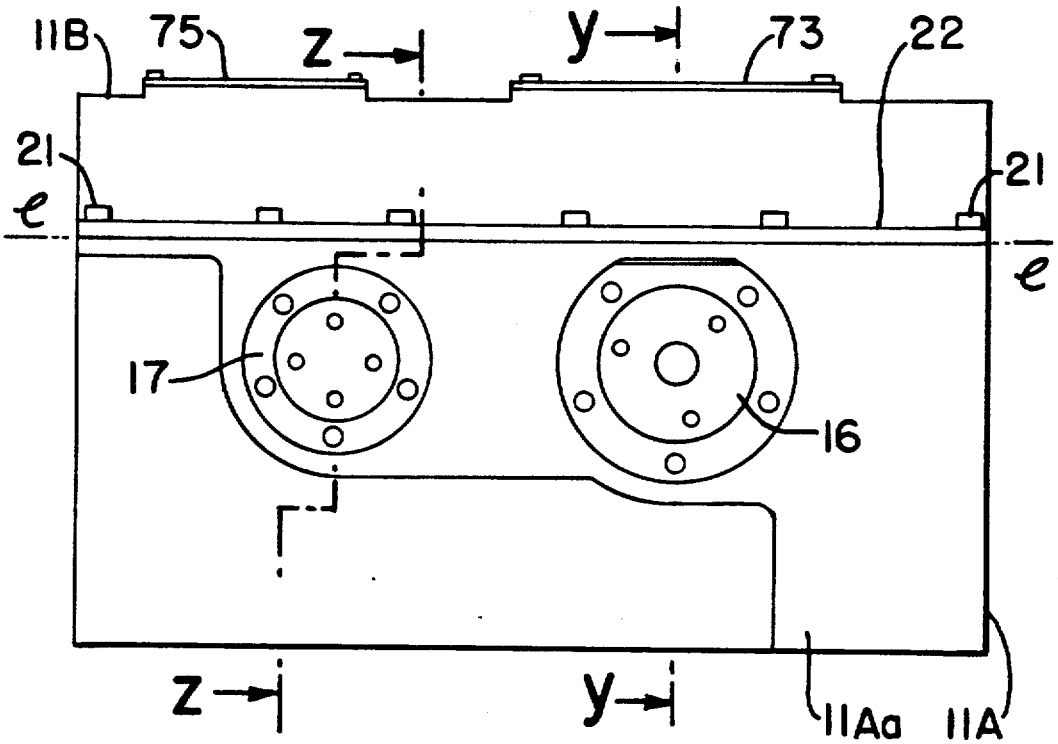
FIG. 4 is a front view of a magnetic disk device according to the present invention, illustrating how the cover and the shell are engaged to each other to keep the housing air tight.

Next, details of the structure of the housing according to the present invention will be disclosed referring to FIGS. 4 though 8. The actual housing includes various parts or components, for example, printed circuit boards, various means to support or drive them, etc. The figures show only the parts relevant to the present invention for the sake of simplicity, and for better understanding of invention.

Figure 5:
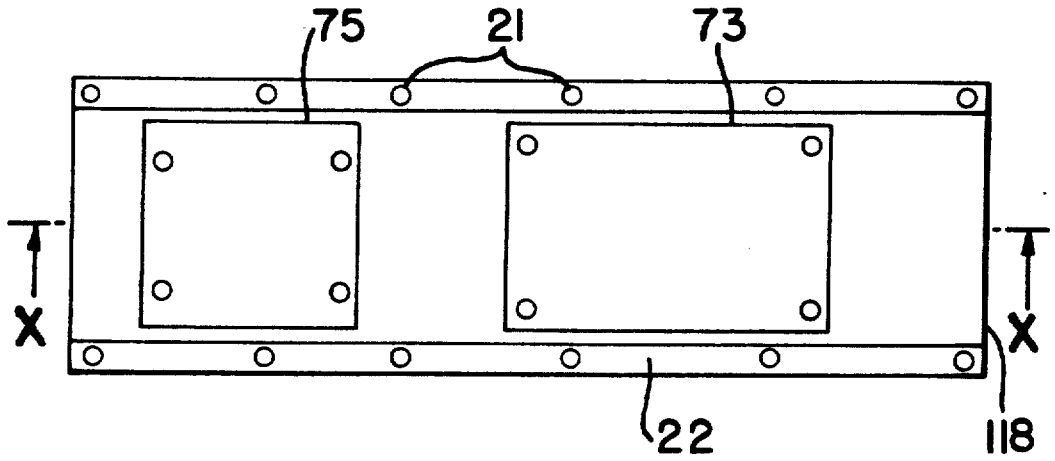
FIG. 5 is a top view of a magnetic disk device according to the present invention seen from an upper side of the cover.
Figure 6:
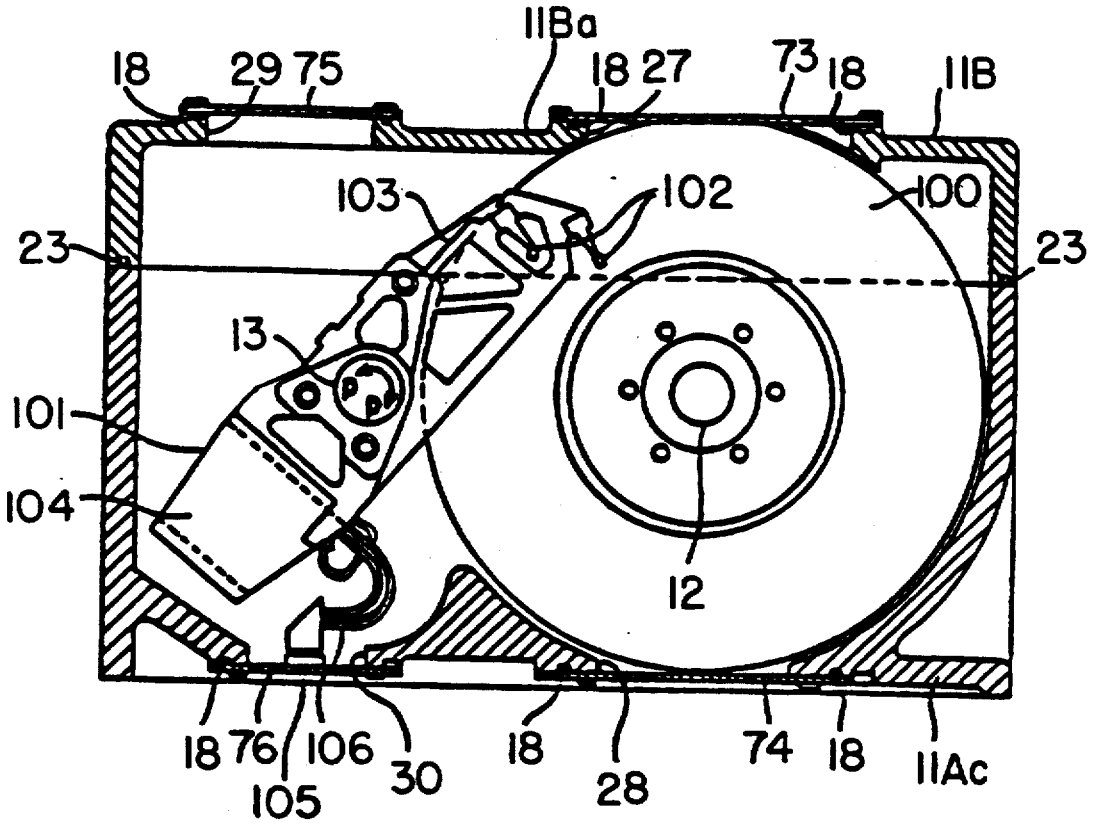
FIG. 6 is a cross sectional view of the device taken along a plane X—X in FIG. 5, illustrating the position of a magnetic disk and magnetic head positioner.

FIG. 4 is a front view, FIG. 5 is a top view, and FIG. 6 is a schematic cross sectional view of a magnetic disk device according to the present invention.

FIG. 4, the housing cover 11B (abbreviated simply as "cover" herein after) and the housing sell 11A (abbreviated simply as "shell" herein-after) are engaged to each other at a separation line e—e. A flange 22 of the cover 11B is fixed to the edge of the shell 11A by screws 21. The cover 11B is provided with openings used for adjusting and inspecting the devices in the housing. These openings (shown in FIG. 6 as 27 and 29) are sealed with cover plates 73 and 75 screwed to the cover 11B. On the front wall (FIG. 4) of the shell 11A is seen the supporting means, which include the bushings 16, 17, and screws to secure them. They will be described later in more detail referring to FIGS. 7 and 8.

FIG. 6 is a schematic cross sectional view of the device taken along a plane X—X in FIG. 5. The disk 100 is supported at its center by the spindle 12 and is rotated about its axis. The head positioner 101 has a plurality of arms 103 (only one is shown) stacked around the spindle 13, and is rotatable to the left or right around the axis of the spindle 13 as shown by an arrow p—p. Each arm 103 carries a magnetic head 102 at its tip. A terminal 105 receives a servo signal from a controller (not shown) and transfer it to a voice coil motor 104 via the wires 106. After receiving the servo signal, the voice coil motor 104 drives the arm 103 to rotate by a determined angle around the spindle 13. Thus, the magnetic head is positioned over a desired magnetic track (not shown) on the surface of the disk 100. The mechanism to drive the arm or the spindle 13 by the voice coil motor 104 is not shown in the figure. This is by conventional means and is not directly relevant to the present invention. Further description is omitted for the sake of simplicity.

The shell 11A and the cover 11B have a tub like shape and are made of aluminum fabricated by die casting. The bottom surface 11Ac of the shell is provided with openings 28 and 30 which are used for adjustment or inspection of the disk and the head positioner. These openings are sealed by cover plates 74 and 76, screwed to the shell 11Ac. At the periphery of each openings 27, 29, 28 and 30 are provided grooves 18. Each of these grooves contains a ring seal (not shown) made from rubber for example, to effect an air tight seal. The open edges of the cover 11B and the shell 11A, defined by the cutting plane 3—3 of FIG. 3, are in a plane parallel to the bottom surface of the tub. They are engaged to each other to close the housing. As can be seen in FIG. 6, between the engaging surfaces of the cover and the shell is inserted a ring seal 23 made of rubber, for example. On the engaging surface of the cover 11B, a groove is provided to receive the ring seal 23. Of course, this sealing mechanism may be any other similar type, such as a gasket.

Figure 7:
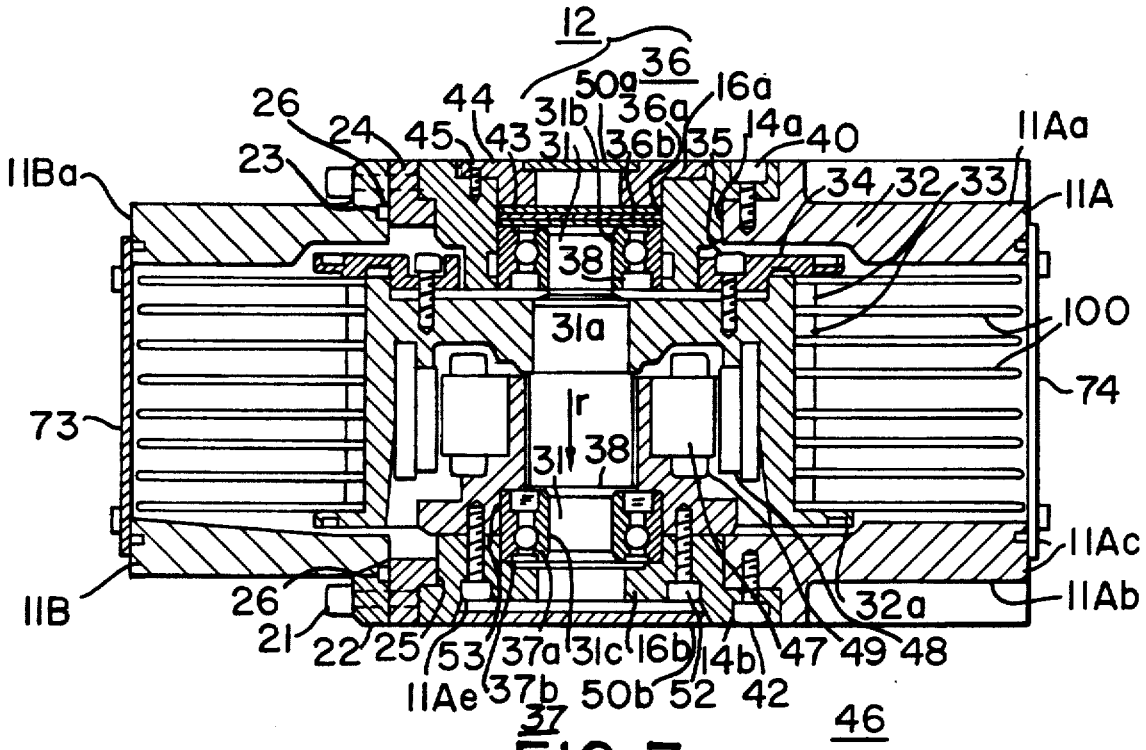
FIG. 7 is a cross sectional view of the device taken along a plane Y—Y in FIG. 4, illustrating how the spindle of the disk pack is supported in the shell.
Figure 8:
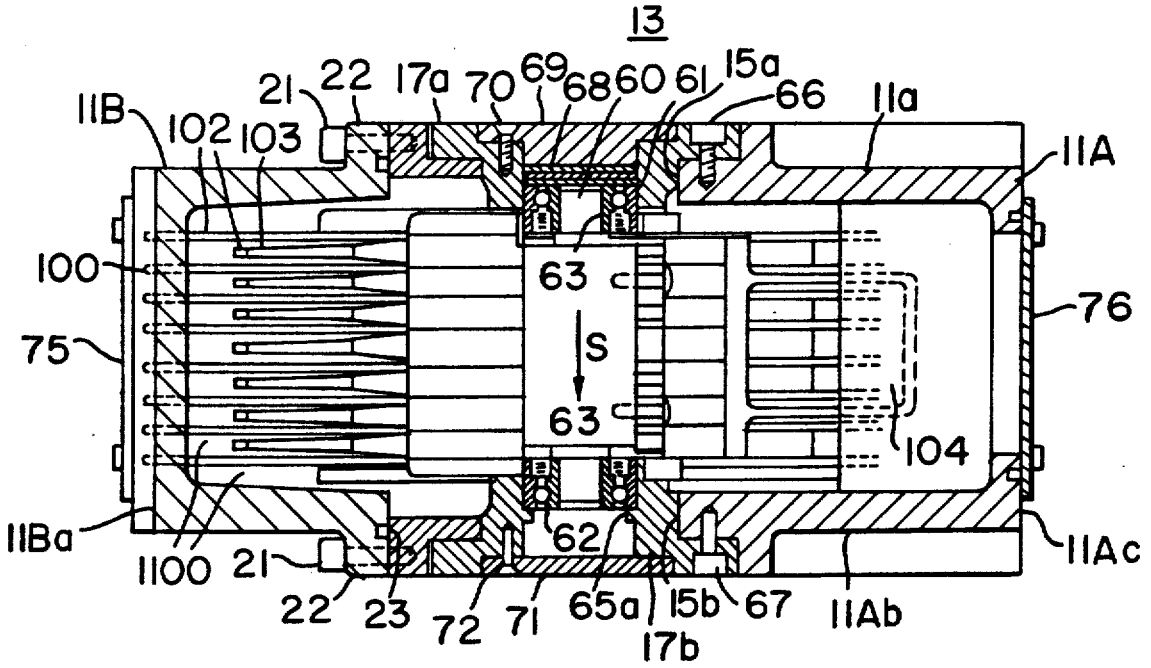
FIG. 8 is a cross sectional view of the device taken along a kinked line Z—Z in FIG. 4, illustrating how the spindle of the magnetic head positioner is supported in the shell.

FIGS. 7 and 8 are cross sectional views of the device of FIG. 4, respectively taken along the line Y—Y and the kinked line Z—Z in FIG. 4. These figures show respectively the supporting mechanism of the spindle 12 of the disk pack and the spindle 13 of the head positioner. In this embodiment, eight disks 100 are coaxially arranged around the spindle 12 and compose the disk pack. The number of the disks may be varied depending on the size of the memory to be stored in the device. As shown in FIG. 7, each opposite end of the spindle 12 is a shaft 31. The diameter of the spindle 12 is larger than that of the shafts 31 at the middle part thereof, forming two step bulges 31a and 31b.

Each disk 100 is separated by a spacer 33 which keeps a predetermined distance between each disk. The disks 100 and the spacer 33 are engaged to the outer surface of a cylindrical hub 32 which has a hollow structure as shown in the figure. At one end (lower end) of the hub 32 is provided a flange 32a. The disks 100 and the spacers 33 are alternately mounted to the hub 32, and fixed by pressing them toward the flange 32a by a holding ring 34, which is placed over the stack of disks and is screwed to the hub 32 by screws 35. The stack of disk is mounted on the spindle 12 from its upper end and held by the step bulge 31a. The diameter of the lower part 31b of the two step bulge is larger than the upper part 31a. The inner diameter of they cylindrical hub 32 is equal to that of the outer diameter of the upper part 31a.

The hub 32 engages the spindle 12 forming the disk pack. The step bulge 31a and the inner surface of the hub 32 are press fitted together. The upper and lower shafts 31 are also press fitted to the inner rings 36a and 37a of the ball bearings 36 and 37 respectively. Thus, the spindle 12 is held at its opposite ends by ball bearings 36 and 37. These ball bearings are fitted with a ferrofluidic seal 38 between respective inner rings 36a, 37a and the outer ring 36b, 37b, so as to maintain air tightness.

In the hollow space of the hub 32 is installed a DC motor 46. The motor 46 is composed of a stator 47, a rotor 48 and a coil 49. The rotor 48 is fixed to the hub 32. The rotor 48 and the disk 100 are finally fixed to the spindle 12, and they are rotatable around the axis of the spindle 12. The stator 47 and the coil 49 are held by a hold element 51, and fixed to a bushing 16b by screws 52. The bushing 16b is further fixed to side wall 11Ab of the shell by screws 42. Thus the stator 47 and the coil 49 are finally fixed to the wall 11Ab of the shell.

The upper and lower bearings 36 and 37 are respectively engaged to cylindrical bushings 16a and 16b. The outer surface of these bushings are finished precisely to fit to the inner surfaces of the supporting holes 14a, 14b which are formed respectively on both side walls 11A and 11B of the shell. Since the inner surface of these bushings are also finished precisely to fit to the outer surface of the ball bearings 36 and 37, the centers of these ball bearings are held accurately coaxial to each other.

The outer ring 37b of the lower ball bearing 37 is supported by an inner flange of the bushing 16b. On the upper ball bearing 36 is placed a belleville spring 43, and the latter is pressed toward the shaft 31 by a collar ring 44. The collar ring 44 is fixed to the bushing 16a by a screw 45, and the bushing 16a is further fixed to the side wall 11Aa of the shell by a screw 40. Thus, the shaft 31 of the spindle 12 is biased in a direction shown by an arrow r, to cut down the backlash of the ball bearings. The open end of the collar ring 44 and the bushing 16b are respectively sealed with end plates 50a and 50b. They are fixed in respective positions by means such as screwing or pasting etc. One example will be shown in FIG. 8.

The structure of the head positioner 101 is almost similar to that of the above described disk pack. FIG. 8 shows a cross sectional view of the device along a kinked line Z—Z in FIG. 4. The spindle 13 comprises a shaft 60 and ball bearings 61 and 62. The arms 103 are piled up and fixed to the spindle 13 in a manner similar to that of the disk pack. Ball bearings 61 and 62 are provided with ferrofluidic seals 63, and are respectively supported at their outsides by cylindrical bushings 17a and 17b. The outer surfaces of these bushings are finished precisely to fit to the holding holes 15a and 15b. Thus, the axis of these ball bearings are accurately positioned to be coaxial to each other. The bushings 17a and 17b are respectively screwed to the side walls 11Aa and 11Ab by screws 66 and 67. The shaft 60 is biased in the direction shown by arrow s by a belleville spring 68 and an end piece 69. The end piece 69 is fixed to the bushing 17a by a screw 70. The open end of the bushing 17b is sealed with a cover plate 71 which is screwed to the bushing 17b by screws 72. The effects and structure of these elements are all similar to those of the disk pack described with respect to FIG. 7. Further details of the disk pack and the head positioner are not relevant to the present invention, and are omitted for the sake of simplicity.

Next, installation of the disk pack and the head positioner in the housing will be described briefly. First, the disks 100 and spacers 33 are fixed to the hub 32 in a manner described before. The stator 47 and the coil 49 are fixed to the hold element 51. The ball bearings 37 is fixed to the shaft 31 by press fitting. Then, the spindle 12 is inserted from its top end into the axial hole of the hold element 51. The outer ring 37b of the ball bearing 37 is fitted to the inner step 53 of the hold element 51, and the hub 32 and the ball bearing 36 are successively fixed to the spindle 12 by press fitting. Thus, assembly of the disk pack is finished.

Figure 9:
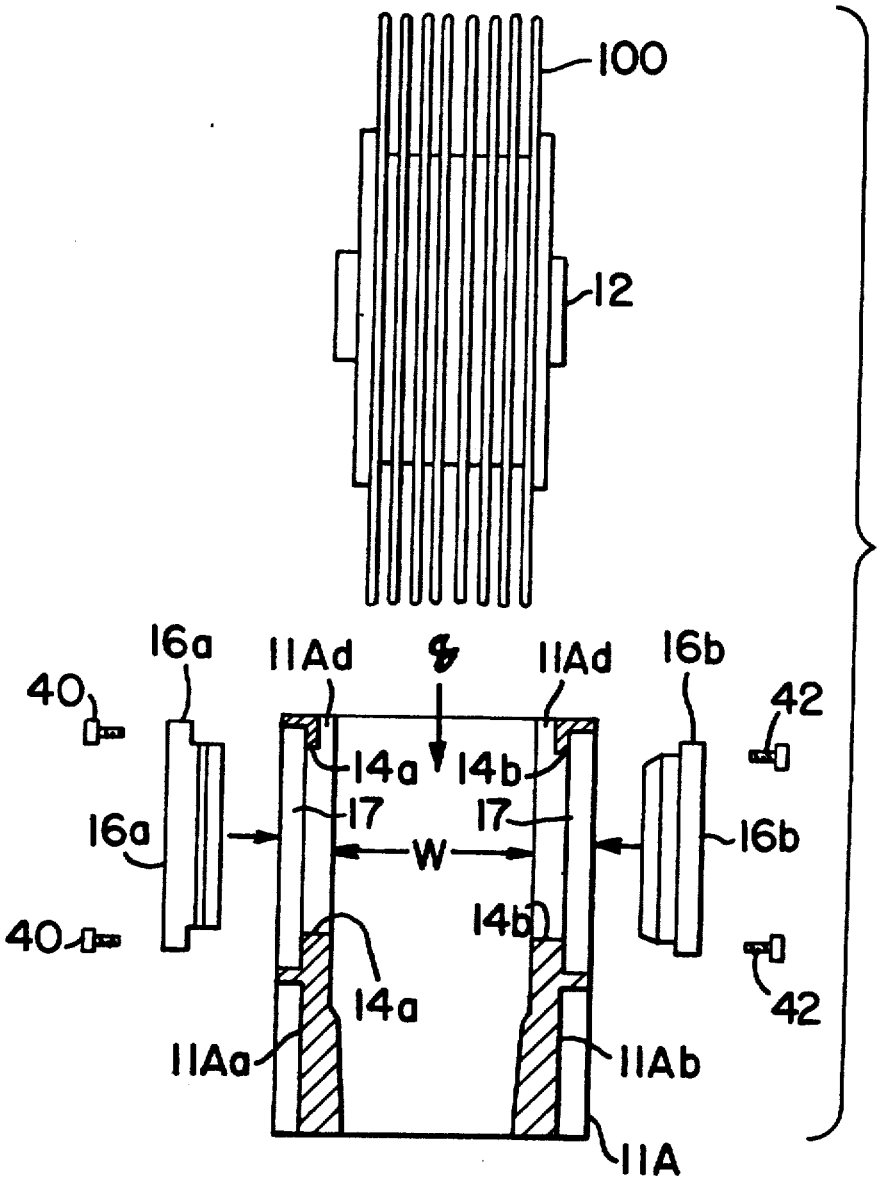
FIG. 9 is a schematic exploded diagram illustrating how the disk pack is installed into the shell.

Next, the disk pack is inserted into the shell 11A from its opening in the direction shown by arrow q in FIG. 9. The disk pack is held in a position where the axis of the spindle coincides with the center of the supporting holes 14a and 14b. Such positioning is done by using a proper jig and tools. For such installation and positioning, the openings 27 and 28 shown in FIG. 6 are used. Since it does not directly relate to the present invention, further description is omitted. Then, the bushings 16a and 16b are inserted into the supporting holes 14a and 14b from opposite sides, so the shafts of the spindle 12 are supported by the bushings 16a and 16b. Then, the bushings 16a and 16b are respectively fixed to the side walls 11Aa and 11Ab by screws 40 and 42. The belleville spring 43 and the collar ring 44 are then set. The head positioner is also mounted in the shell in a similar manner.

Figure 10:
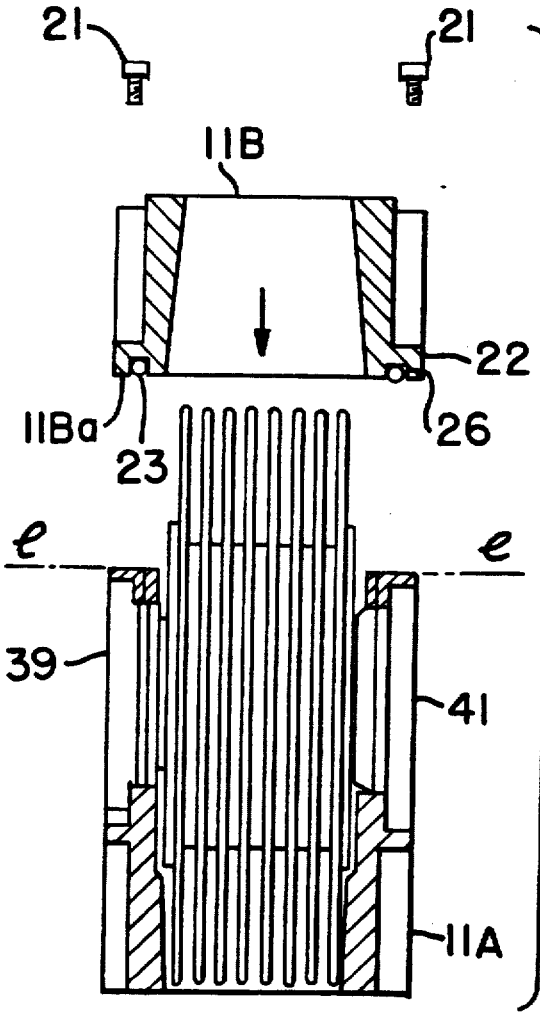
FIG. 10 is a schematic explosion diagram illustrating how the cover is engaged to the shell of the housing.

Finally, the cover 11B is set. When the disk pack and the head positioner are installed into the shell it looks as shown in FIG. 10. FIG. 10 is a partially cut away view illustrating the disk pack part installed in the shell 11A. The cover 11B is provided on its joining surface 11Ba with a groove 26. In the groove 26 is inserted a ring seal 23. The shell 11A and the cover 11B are joined to each other at the joining surface e—e. The flange 22 of the cover 11B is fixed to the shell by screws 21.

In the above disclosure, as shown in FIGS. 7 or 8, the cylindrical bushings should protrude inside the shell when they are inserted into respective holding holes in order to support the spindles. In practice, the magnetic disk device is required to be cut down its size as small as possible due to design requirements of the equipment using the disk device. Sometimes as shown in FIG. 9, the inner width W of the shell is reduced to be less than the length of the spindles to be installed therein. In order to pass through the spindle 12 to the holding holes 14a and 14b, the inner surface of the shell 11A is partially grooved from the open edge to the holding hole 14b as shown in FIG. 9 by a reference numeral 11Ad. The width of the shell is reduced to a minimum by providing such grooves. It will be apparent, however, that such grooves 11Ad neither cut through the side walls 11Aa and 11Ab perfectly nor partially cut away the holding holes 14a or 14b, but only make the side walls 11Aa and 11Ab thinner. Therefore, the mechanical strength of the shell and the perfect roundness of the supporting holes 14a and 14b is maintained. Of course, such groove 11Ad is necessary, if the shell 11A is allowed to have enough inner width to insert the spindle 12. Further, as shown in FIG. 4, the outer fringe of the bushing 16 is partially cut away. This is done to reduce the height of the side wall 11A and thereby to reduce the height of the device; holding holes 10 are never cut away.

In the above disclosure, the explanation assumes that both spindles of the disk pack and the head positioner are supported at their opposite ends, although the scope of the invention can be extended to the structure in which only one of the spindles is held by the structure of the present invention.

As has been described above, the housing of the present invention supports the spindles of the disk pack and the head positioner at both opposite ends. The supporting portion of the spindles are positioned in a shell having an integral construction. Mechanical strength of the support is increased, and thermal off-track is avoided. The holding holes to support the bearing are formed precisely coaxial to each other because they are bored in one process. Thus the holes have a perfect circular periphery and the centering of the bearings to support the spindle are precisely aligned coaxially to each other. The mutual position of the magnetic head and the disk is held in a stable position. Since the shell has no cut-in portion on the joining plane of the shell and cover, the mechanical strength is increased. By using the housing of the present invention, therefore, the reliability of the disk pack device is maintained for a long period of time. The structure of the housing is simple, the number of parts is reduced and the construction of the device is easy. the cost of the magnetic disk device is thereby reduced.

What is claimed is:

1. A housing for supporting a magnetic disk pack and a magnetic head positioner therein, said magnetic disk pack including a plurality of magnetic disks supported by a first spindle having opposite ends, said magnetic head positioner including a second spindle having opposite ends and supporting a plurality of arms, each arm carrying a magnetic head, the housing comprising:

a shell having an open end, a closed end and two opposite sidewalls, said shell having a one-piece construction;

a cover detachably connected to the open end of said shell, said cover having a one-piece construction;

said shell and cover having open edges which are coplanar when joined to each other to form a chamber which encloses said magnetic disk pack and said magnetic head positioner therein, thereby mechanically sealing the magnetic disk pack and magnetic head positioner off from the exterior of the chamber;

said shell mechanically supporting both of said magnetic disk pack and said magnetic head positioner, and said cover closing the open end of the shell through which said magnetic disk pack and said magnetic head positioner are inserted; and a first pair of supporting means mounted in a first pair of axially aligned circular holding holes, one hole of each pair being formed in each of the two opposite sidewalls of said shell for receiving a corresponding one of the first pair of supporting means which supports said first spindle at opposite ends thereof, each hole of the first pair of circular holding holes having a continuous circumferential edge;

the plane containing said open edges of said shell and cover being-non-intersecting with and non-tangent to said first pair of holding holes and said first pair of supporting means.

2. A housing according to claim 1, further comprising a second pair of supporting means mounted in a second pair of axially aligned circular holding holes, one hole of each pair being formed in each of the two opposite sidewalls of said shell for receiving a corresponding one of the second pair of supporting means which supports the second spindle, each hole of the second pair of circular holding holes having a continuous circumferential edge.

3. A housing according to claim 2, wherein the first and second pairs of supporting means comprises:

first and second pairs of cylindrical bushings respectively fitted into a corresponding one of said first and second paris of said holes from outside of said shell, wherein said open edge of said shell is non-intersecting with either of said first and second pairs of holding holes.

4. A housing according to claim 3, wherein each of the first and second pairs of said supporting opposite ends of each of said first and second spindles, and each pair of said ball bearings is supported by respective pairs of said bushings.

5. A housing according to claim 4, wherein each bushing of said first and second pairs of cylindrical bushings have a length sufficient to protrude inward of the shell for supporting said corresponding pairs of bearings when said bushings are inserted into respective pairs of holding holes from outside the shell.

6. A housing according to claim 1, wherein said opposite side walls have grooved respective inner surfaces extending inwardly from the open end of the shell to said first pair of holding holes, thereby thinning each side wall at a portion thereof in order to allow passage of the first spindle which is longer than an inner width of the shell at a remaining portion thereof.

7. A housing according to claim 3, wherein said open end of the shell is in a plane which is parallel to a plane including both axes of said spindles, and spaced from said first and second pairs of supporting means.

8. A housing according to claim 3, wherein each hole of said first and second pairs of holes is formed simultaneously by boring through the opposite side walls of the shells in one boring process.

9. A housing for supporting a magnetic disk pack and a magnetic head positioner therein, said magnetic disk pack including a plurality of magnetic disks supported by a first spindle having opposite ends, said magnetic head positioner including a second spindle having opposite ends and supporting a plurality of arms, each arm carrying a magnetic head, the housing comprising:

a shell having an open end, a closed end and two opposite sidewalls, said shell having a one-piece construction;

a cover detachably connected to the open end of said shell, said cover having a one-piece construction;

said shell and cover having open edges which are coplanar when joined to each other to form a chamber which encloses said magnetic disk pack and said magnetic head positioner therein, thereby mechanically sealing the magnetic disk pack and magnetic head positioner off from the exterior of the chamber;

said shell mechanically supporting both of said magnetic disk pack and said magnetic head positioner, and said cover closing the open end of the shell through which said magnetic disk pack and said magnetic head positioner are inserted;

a first pair of supporting means mounted in a first pair of axially aligned circular holding holes, one hole of each pair being formed in each of the two opposite sidewalls of said shell for receiving a corresponding one of the first pair of supporting means which supports said first spindle at opposite ends thereof, each hole of the first pair of circular holding holes having a continuous circumferential edge;

the plane containing said open edges of said shell and cover being-non-intersecting with and non-tangent to said first pair of holding holes and said first pair of supporting means, wherein said opposite said walls are provided with grooves extending longitudinally from the open end of the shell to the first pair of axially aligned circular holding holes in opposed walls of the housing to facilitate mounting of the first spindle in the first pair of axially aligned circular holding holes.

*10. A housing for supporting a magnetic disk pack and a magnetic head positioner therein, said magnetic disk pack including a plurality of magnetic disks supported by a first spindle having opposite ends, said magnetic head positioner including a second spindle having opposite ends and supporting a plurality of arms, each arm carrying a magnetic head, the housing comprising:*

*a shell having an open end, a closed end and two opposite sidewalls, said shell having a one-piece construction;*

*a cover detachably connected to the open end of said shell, said cover having a one-piece construction;*

*said shell and cover having open edges which are coplanar when joined to each other to form a chamber which encloses said magnetic disk pack and said magnetic head positioner therein, thereby mechanically sealing the magnetic disk pack and magnetic head positioner off from the exterior of the chamber;*

*said shell mechanically supporting said first spindle of said magnetic disk pack and said second spindle of said magnetic head positioner, and said cover closing the open end of the shell through which said magnetic disk pack and said magnetic head positioner are inserted; and*

*a first pair of supporting means mounted in a first pair of axially aligned circular holding holes, one hole of each pair being formed in each of the two opposite sidewalls of said shell for receiving a corresponding one of the first pair of supporting means which supports said second spindle at opposite ends thereof, each hole of the first pair of circular holding holes having a continuous circumferential edge;*

*the plane containing said open edges of said shell and cover being-non-intersecting with and non-tangent to said first pair of holding holes and said first pair of supporting means, said first and second spindles being located on the shell side of said plane.*

*11. A housing for supporting a magnetic disk pack and a magnetic head positioner therein, said magnetic disk pack including a plurality of magnetic disks supported by a first spindle and a magnetic head positioner supporting a plurality of arms supported by a second spindle, each arm carrying a magnetic head, the housing comprising:*

*a shell having an open end, a closed end and two opposite sidewalls, said shell having a one-piece construction;*

*a cover detachably connected to the open end of said shell, said cover having a one-piece construction;*

*said shell and cover having open edges which are coplanar when joined to each other to form a chamber which encloses said magnetic disk pack and said magnetic head positioner therein, thereby mechanically sealing the magnetic disk pack and magnetic head positioner off from the exterior of the chamber;*

*said shell mechanically supporting both of said magnetic disk pack and said magnetic head positioner, and said cover closing the open end of the shell through which said magnetic disk pack and said magnetic head positioner are inserted; and*

*each of the two opposite sidewalls of said shell including first holding holes for mounting said first spindle for magnetic disk pack rotation; and*

*each of the two opposite sidewalls of said shell including second holding holes for mounting said second spindle for magnetic head positioner rotation; and*

*the plane containing said open edges of said shell and cover being non-intersecting with and non-tangent to said first and second holding holes.*

* * * * *